United States Patent [19]

Toncelli

[11] Patent Number: 4,620,525

[45] Date of Patent: Nov. 4, 1986

[54] SOUNDPROOF SHEATH FOR THE PROTECTION OF SAWING CIRCULAR BLADES USED FOR CUTTING MARBLE, GRANITE AND HARD STONE

[75] Inventor: Marcello Toncelli, Bassano del Grappa, Italy

[73] Assignee: Breton S.p.A., Castello di Godego, Italy

[21] Appl. No.: 694,931

[22] Filed: Jan. 25, 1985

[30] Foreign Application Priority Data

Feb. 3, 1984 [IT] Italy ................. 85519 A/84

[51] Int. Cl.⁴ ......................................... B28D 1/02
[52] U.S. Cl. .................................. 125/13 R; 51/268; 83/835
[58] Field of Search ............... 125/15, 12, 13 R; 51/268; 83/835

[56] References Cited

U.S. PATENT DOCUMENTS

| | | | |
|---|---|---|---|
| 1,638,459 | 8/1927 | Ritz | 51/268 |
| 2,462,710 | 2/1949 | Ballinger | 51/268 |
| 2,707,854 | 5/1955 | Johnson | 51/268 |
| 2,990,828 | 7/1961 | Hoerer | 125/15 |
| 3,860,085 | 1/1975 | Gilbert | 51/268 |

FOREIGN PATENT DOCUMENTS

| | | | |
|---|---|---|---|
| 122849 | 10/1927 | Switzerland | 51/268 |
| 363929 | 10/1962 | Switzerland | 125/13 R |

Primary Examiner—Harold D. Whitehead
Attorney, Agent, or Firm—Bucknam and Archer

[57] ABSTRACT

A sheath for deadening the sound of at least one circular blade for cutting marble, granite and hard stone consists of at least one structure of "Bakelite" or other sound deadening material, the structure forming at least one cavity of discoidal shape. The cavity provides a housing for at least one rotating cutting blade. The cutting blade may be provided with teeth along its periphery, thereof. The sheath may comprise of two hollow structures of great thickness connected by threaded rods forming between themselves, two cavities of discoidal shape, in which the cutting blades rotate.

1 Claim, 2 Drawing Figures

SOUNDPROOF SHEATH FOR THE PROTECTION OF SAWING CIRCULAR BLADES USED FOR CUTTING MARBLE, GRANITE AND HARD STONE

The present invention relates to protection sheaths for circular blades used for cutting marble, granite and hard stones. More specifically, the present invention relates to sheaths which are used to drastically reduce the amount of the noise produced by the blades during the cutting operation so as to make the work more bearable for the cutter, as well as all the people who work in the area or who live in the vicinity.

It is well known that one of the drawbacks which is encountered in proximity of the rotating blades of circular saws for marble consists of the high level of noise produced by the cutting machine, which is unbearable, not only for the cutter who frequently is compelled to use earplugs or protective helmets, but also for all the people who happen to be in the vicinity of the cutting machine in the interior as well as outside of the building in which the cutting machine is operated.

The noise is particularly strong when the blades are provided with diamond cutting teeth which facilitate the sawing operation of the marble, but which also emit in the surrounding space, sounds of particular frequency and high intensity. These sounds are increased by the vibrations to which the blades are subjected when they operate in an open space or with the usual protective sheaths made by a plate or similar material.

The object of the present invention is to provide a sheath particularly intended to cover completely, the rotating blades with a sound deadening material, such as "Bakelite" or other suitable material and to provide a sheath which not only reduces the intensity of the sound vibrations which propagate to the exterior of the sheath, but also limit the oscillations of the blades themselves because of the reduced space within which the blades rotate.

The sheath of the present invention is illustrated hereinbelow by reference of the accompanying drawings which show one embodiment of the sheaths.

Figure 1:
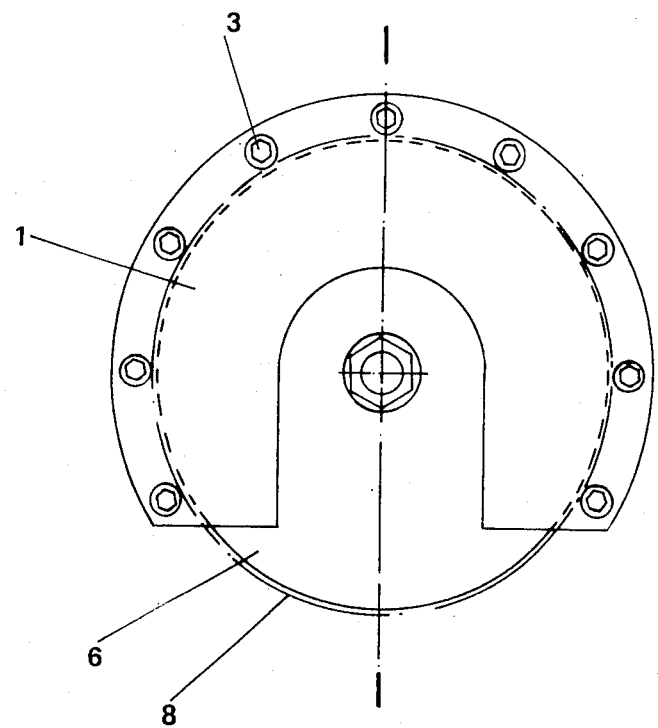
FIG. 1 is a front view of the circular saw provided with the sheath of this invention.
Figure 2:
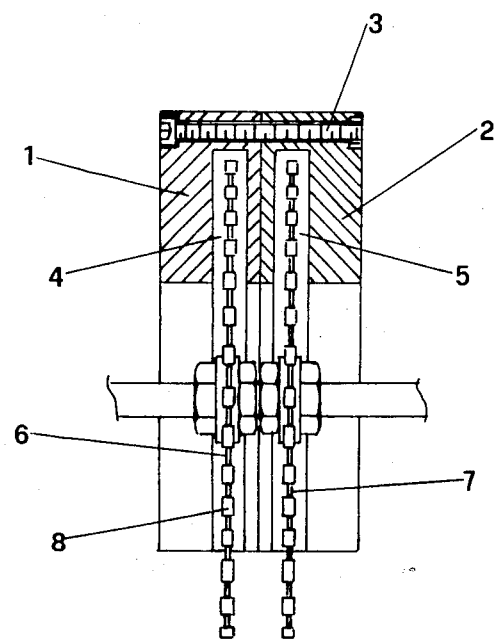
FIG. 2 is a vertical axial view of the same.

The sheath of the present invention comprises a hollow body of suitable material consisting for instance, of two parts, 1 and 2 which are connected by threaded rods 3 in such a manner as to form as shown in the figures, two cavities of discoidal shape 4 and 5, within which the cutting blades 6 and 7 rotate. The blades are provided along their periphery with diamond cutting teeth 8.

The dimensions of the cavities 4 and 5, as well as the thickness of the sheaths 1 and 2 with relation to the material being used, are determined in such a manner as to deaden substantially the vibrations to which the blades 6 and 7 are subjected during the cutting operation, as well as to isolate acoustically the external space from the noise produced by the blades themselves.

Tests which have carried out, have permitted to verify that with adequate dimensions and a proper selection of the material used, it is possible to reduce substantially, the noise produced by the cutting blades in the surrounding space in addition to modify the sound pattern, that is, to reduce particularly the frequencies which cause the greatest disturbance.

The example illustrated in the figures, shows two circular cutting blades, but it is clear that the sheath may be provided also for groups of several blades or also for a single blade while keeping constant the essential characteristics of the sheath.

What is claimed is:

1. A sheath for deadening the sound of circular blades for cutting marble, granite and hard stone which consists of two hollow structures made of "Bakelite" sound deadening material and connected by threaded rods, forming between themselves, two cavities of discoidal shape, the cavities providing a housing for a cutting blade in each cavity, each of said blades rotating within each of said cavities, each of said cutting blades having teeth along the periphery thereof, the said hollow structures having walls of substantial thickness relative to each of said blades, the inner dimensions of said cavities being only slightly greater than the dimensions of said blades and being sufficient to deaden substantially the noise of said blades during operation.

* * * * *